US005302435A

United States Patent [19]

Hashimoto

[11] Patent Number: 5,302,435

[45] Date of Patent: Apr. 12, 1994

[54] PLASTIC SHEET WITH A RULED LINE FOR BENDING

[75] Inventor: Tadashi Hashimoto, Nagahama, Japan

[73] Assignee: Mitsubishi Plastics Industries Limited, Tokyo, Japan

[21] Appl. No.: 978,481

[22] Filed: Nov. 18, 1992

[30] Foreign Application Priority Data

| | | | |
|---|---|---|---|
| Mar. 24, 1992 | [JP] | Japan | 4-066073 |
| Sep. 7, 1992 | [JP] | Japan | 4-238561 |
| Sep. 7, 1992 | [JP] | Japan | 4-238567 |
| Sep. 7, 1992 | [JP] | Japan | 4-238570 |

[51] Int. Cl.[5] ..... B32B 3/28

[52] U.S. Cl. ..... 428/167; 428/156; 428/192

[58] Field of Search ..... 428/167, 156, 12, 33, 428/137, 192, 212, 542.8

[56] References Cited

U.S. PATENT DOCUMENTS 3,907,193 9/1975 Heller ..... 229/16
4,570,546 2/1986 Batelka ..... 428/167
4,986,496 1/1991 Marentic et al. ..... 428/167

FOREIGN PATENT DOCUMENTS 2456613 12/1980 France .
63-91455 6/1988 Japan .
64-40317 2/1989 Japan .
1-141720 6/1989 Japan .
2-249626 10/1990 Japan .

*Primary Examiner*—Donald J. Loney
*Attorney, Agent, or Firm*—Oblon, Spivak, McClelland, Maier & Neustadt

[57] ABSTRACT

A plastic sheet having a groove as a ruled line in at least one surface of a plastic sheet. The groove is composed of a cut portion or a deep recess portion and a shallow recess portion in the longitudinal direction of the groove, and chamfered portions having a radius of curvature of 0.05–1 mm are formed at both ends in the longitudinal direction of the bottom of the shallow recess portion.

5 Claims, 13 Drawing Sheets

PLASTIC SHEET WITH A RULED LINE FOR BENDING

BACKGROUND OF THE INVENTION

1. Field of the Invention

The present invention relates to a plastic sheet with a ruled line for bending. More particularly the present invention relates to the structure of a ruled line which forms a bent portion when a plastic sheet is bent.

2. Discussion of Background

In bending a plastic sheet to form a container for packaging, it is a usual way to form a ruled line for bending in the sheet and to bend the plastic sheet along the ruled line. Usually, a plastic sheet with a ruled line in its one surface has been used.

In the conventional plastic sheet with a ruled line for bending in its one surface, there was a problem that it was difficult to bend the sheet because corner portions in the width direction of the ruled line come to contact with the surface of the plastic sheet when it was bent. In order to solve the problem, it is considered that the width of the ruled line is broadened. However, the formation of a wide and deep ruled line in the plastic sheet requires that a press mold for forming a ruled line has to be pressed under a high pressure to the plastic sheet, which may break the sheet depending on the physical properties of the sheet. Further, when a wide ruled line is formed, the plastic sheet is stretched in the lateral direction. Accordingly, when a small-sized box is manufactured from such plastic sheet, there may result a wrinkle and waviness at a portion where ruled lines are crossed.

In order to solve the above-mentioned problem, there is a proposal of a plastic sheet with a ruled line as shown in FIG. 6. Namely, the plastic sheet has a groove as a ruled line for bending in which shallow recess portions 2 and deep recess portions 3 are alternately formed in the longitudinal direction of the bottom portion of the groove by providing convex and recess portions or discontinuous holes (Japanese Examined Utility Model Publication No. 9345/1992).

Although the plastic sheet having the above-mentioned construction can provide easy bending characteristic, there was a problem as follows. When the plastic sheet is bent along a ruled line 1, both end portions *2a*, *2a* of the bottom of the shallow recess portions 2 are exposed with sharp ridges as shown in a perspective view in FIG. 7. Accordingly, a touch feel to these portions is no good and if cloth or the like is put in the container fabricated with a plastic sheet, there is a danger of damaging the cloth because a string of the cloth cross is caught by a sharp ridge in the ruled line.

SUMMARY OF THE INVENTION

It is an object of the present invention to provide a plastic sheet with a ruled line for bending which provides an excellent bending characteristic and has no sharp edge when the sheet is bent.

According to the present invention, there is provided a plastic sheet with a ruled line for bending which comprises a groove as a ruled line in at least one surface of a plastic sheet wherein the groove is composed of a cut portion or a deep recess portion and a shallow recess portion in the longitudinal direction of the groove, and chamfered portions having a radius of curvature of 0.05–1 mm are formed at both ends in the longitudinal direction of the bottom of the shallow recess portion.

According to the construction of the plastic sheet of the present invention, since the chamfered portions are formed at both end portions of the bottom of the shallow recess portion, a touch feeling is excellent after the sheet has been bent, there is no catching of cross by the ruled line, and a good container for packaging can be obtained. Further, at the chamfers portion, since resin is more compressed than the other portion of the plastic sheet, the strength and hardness of this portion is improved whereby the breaking of the portion can be prevented.

DESCRIPTION OF THE PREFERRED EMBODIMENTS

Preferred embodiments of the plastic sheet with a ruled line of the present invention will be described in detail with reference to the drawings.

Figure 1:
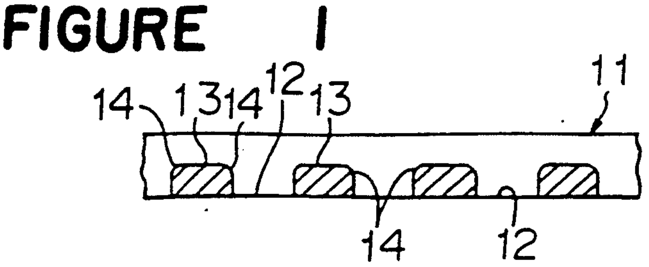
FIG. 1 is a cross-sectional view along a ruled line for bending formed in a plastic sheet according to the present invention.

FIG. 1 shows a ruled line 11 for bending formed in a plastic sheet. The ruled line 11 comprises deep recess portions 12 and shallow recess portions 13 which are alternately formed in the longitudinal direction of the ruled line 11. In this embodiment, the deep recess portions 12 are respectively holes passing the plastic sheet from one surface to the other surface. Each of the shallow recess portions 13 is provided with chamfered portions 14, 14 at both end portions in the longitudinal direction of the bottom of the recess.

Figure 2:
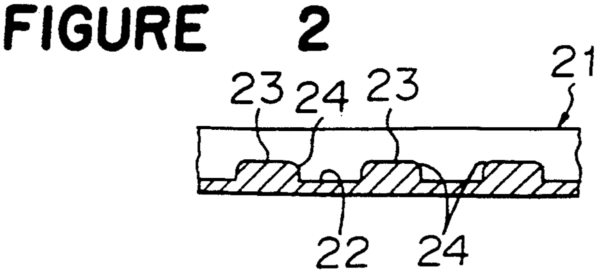
FIG. 2 is a cross-sectional view along a ruled line for bending formed in a plastic sheet according to the second embodiment of the present invention.

A ruled line for bending 21 shown in FIG. 2 has a convex and concave structure wherein deep recess portions 22 and shallow recess portions 23 are alternately formed, and chamfered portions 24, 24 are formed at both end portions in the longitudinal direction of the bottom of the shallow recess portions 23.

Figure 3:
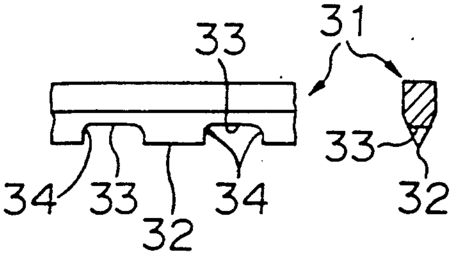
FIG. 3 is a diagram showing an example of a blade for forming a ruled line in a plastic sheet.

The ruled line for bending 11 or 21 in FIGS. 1 and 2 can be formed by using a blade 31 having a shape shown in FIG. 3. The blade for forming a ruled line has a long blade portion 32 for forming a deep recess portion and a short blade portion 33 for forming a shallow recess portion which are formed alternately wherein both ends of the short blade portion 33 is provided with curved portions 34, 34 for forming the chamfered portion 14 or 24. The ruled line for bending 11 or 21 is formed by placing a plastic sheet on a flat plate, and pushing the blade 31 to the plastic sheet by means of a pressing machine. At the moment, when the long blade portion 32 is pushed to reach the flat plate, the ruled line 11 having a shape shown in FIG. 1 is formed. On the other hand, a ruled line 21 having a shape shown in FIG. 2 is formed by stopping the blade 31 just before reaching the flat plate.

It is preferable that the radius of curvature of the chamfered portion 14 or 24 is in a range of about 0.05–1 mm. When the radius of curvature is smaller than 0.05 mm, a touch feel is poor because there is a slight angle at a corner portion. On the other hand, when the radius of curvature exceeds 1 mm, a large pushing force of pressing die is required to form a ruled line, and processability is decreased, and the strength of the plastic sheet is decreased at the shallow recess portions.

Thus, by forming a ruled line comprising deep recess portions and shallow recess portions in an alternate manner in a plastic sheet along the longitudinal direction of the ruled line and by forming chamfered portions in the shallow recess portions, a good touch feeling can be obtained at the ruled line when the plastic sheet is bent. Further, the strength of the shallow recess portions is improved because the shallow recess portions suffer a much compression force in comparison with the other portion.

Determination as to whether or not the deep recess portions are formed by penetrating the plastic sheet from one surface to the other in the ruled line depends on the physical properties and the thickness of a plastic sheet used. Further, the bending characteristic and the strength can be adjusted by controlling the remaining thickness of the deep recess portions and the depth of the shallow recess portions and a ratio of the deep recess portions to the shallow recess portions.

It is preferable that the length of the shallow recess portions and the deep recess portions are respectively in a range of 0.3–1.5 mm. When the length exceeds the above-mentioned range, the appearance of the ruled line is poor. On the other hand, when the length are shorter, the top edge of the blade for forming the ruled line becomes weak, especially, the top edge of the longer blade portion may be deformed or broken. The angle of the edge of the blade is preferably in a range of 30°–120°. However, the shape of the blade depends on the physical properties and the thickness of a plastic sheet used. For instance, the angle of the edge of the blade may be different between the shallow recess portion and the deep recess portion. Further, the ruled line may have a three-stage structure or more.

As the plastic sheet, a sheet of polyvinyl chloride, polyethylene, polypropylene, polyester or polycarbonate or a composite sheet may be used. Usually, the thickness of the plastic sheet is in a range of 0.1–1.0 mm.

Figure 4:
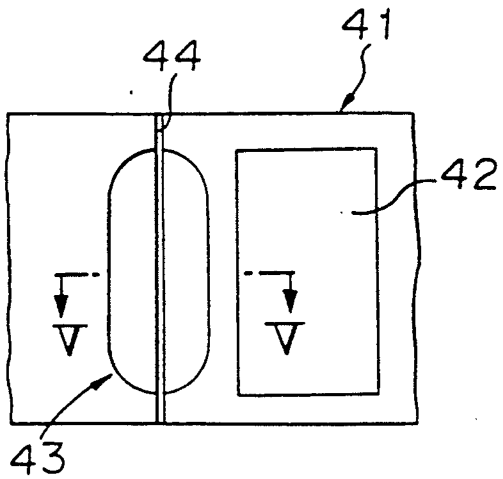
FIG. 4 is a diagram showing a plastic sheet with a ruled line, which has a shaping portion.
Figure 5:
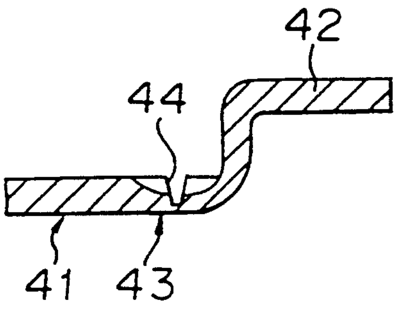
FIG. 5 is a cross-sectional view taken along a line V—V in FIG. 4.
Figure 6:
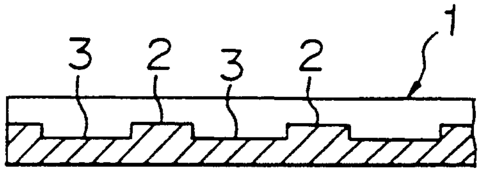
FIG. 6 is a cross-sectional view showing a conventional plastic sheet with a ruled line.
Figure 7:
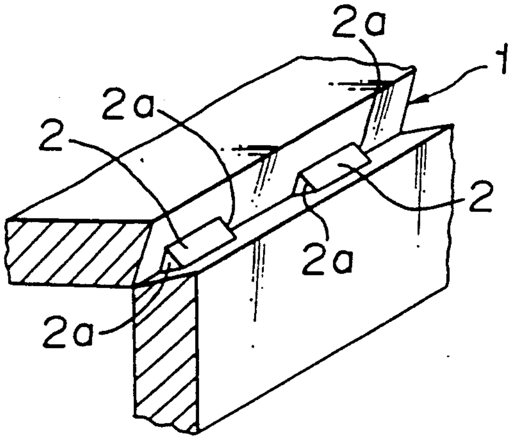
FIG. 7 is a perspective view partly omitted showing a plastic sheet with a ruled line for bending, which is bent along the ruled line.

In the plastic sheet of the present invention, a ruled line for bending is formed by pushing a blade for forming a ruled line having more than two stages of depth to a plastic sheet. Accordingly, a uniform ruled line for bending can be obtained even when the thickness of the plastic sheet is fairly scattered. Namely, as shown in FIGS. 4 and 5, when a plastic sheet 41 is formed by a vacuum method, the thickness of a portion 43 near a forming portion 42 is formed to be fairly thin because of vacuum shaping. In a conventional ruled line 44, there is scattering in the depth; namely there is discontinuation of ruled line or the breaking of plastic sheet when a linear ruled line is formed. In a case of an intermittent ruled line, an uniform bending characteristic can not be obtained because the wall thickness of the sheet is large.

However, in the ruled line for bending of the present invention, it is possible to easily obtain a plastic sheet having a uniform bending characteristic along the entire length of the ruled line.

In accordance with a plastic sheet with a ruled line for bending shown in FIGS. 1 and 2, a ruled line has cut portions or deep recess portions and shallow recess portions in the longitudinal direction of the ruled line wherein chamfered portions having a radius of curvature of 0.05–1 mm are formed at both ends in the longitudinal direction of the bottom of the shallow recess portions. Accordingly, it provides a good touch feel at a bent portion of the plastic sheet. An excellent package can be obtained wherein even when cloth is put in the package container and it comes to contact with a ruled line portion, there is no danger of catching. Further, there is less possibility of breaking because the strength and the hardness of the ruled line portion are improved because that portion is more compressed than the other portion.

Figure 8:
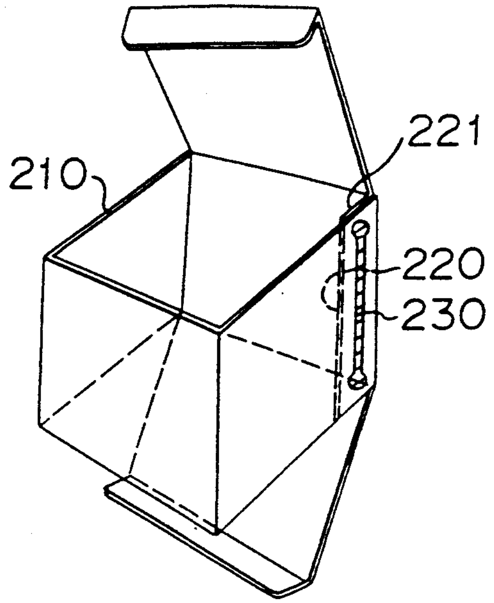
FIG. 8 is a perspective view of an embodiment of a plastic case.
Figure 9:
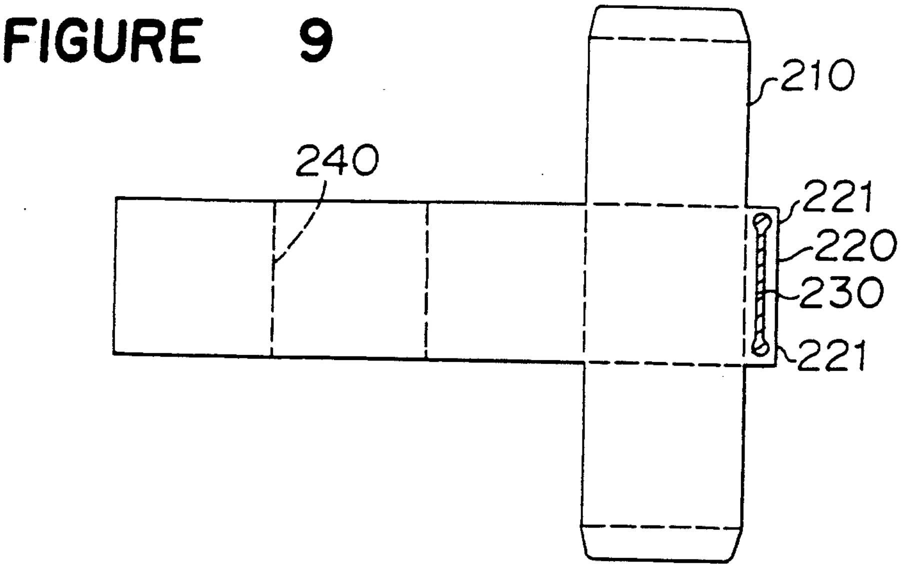
FIG. 9 is a plane view showing a developed state of the plastic case shown in FIG. 8.
Figure 10:
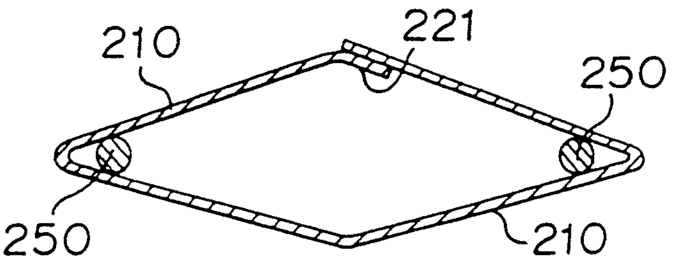
FIG. 10 is a cross-sectional view for illustrating a method of measuring the peeling strength at a bonding portion of a plastic case.

FIGS. 8–10 show a container made of a plastic sheet. The plastic container is formed by bending a plastic sheet and applying an adhesive agent on overlapping portions of the sheet wherein the width of an area to be applied with the adhesive on the overlapping portions or the quantity of the adhesive to be applied per unit surface area is larger than the other portion.

In a conventional method of forming a plastic case, a plastic sheet with ruled lines for bending is bent and an adhesive is coated on portions to be bonded of the plastic sheet, and the overlapping portions are bonded together. Generally, the adhesive is coated on a surface corresponding to the side surface of a container in consideration of convenience or the appearance of a product and manufacturing steps, and the plastic sheet is bent into a tube-like form, and the portions applied with the adhesive are bonded together.

There are bent flaps at both end portions of the tube-like case, which are used for closing the both ends of the case when an article is put in it. The case of plastic sheet fabricated by bonding is supplied to a user in a flatly folded state. When an article is to be put in a container at the users side, the flatly folded container is opened in a tube-like form by a box machine. The bottom cover is closed, and an article is put in the container, and the top flap is bent to cover the top opening of the container.

When the conventional plastic case is assembled into a box by a box machine at the users side, the flap portion is bent 90° at a high speed. Accordingly, there is a stress at the end portions of the bonded surface. When the bonding is insufficient, that portion is separated. On the other hand, there is a requirement that an amount of the adhesive be small as possible in view of environmental and operational conditions.

In the present invention, as shown in FIGS. 8 and 9, a plastic casing is formed by bending a plastic sheet 210, coating an adhesive 230 on surfaces to be bonded in the plastic sheet 210, and bonding the surface portions of the sheet wherein a width of an area to be applied with the adhesive near the end portion 221 of the surface portions to be bonded 220 or quantity of the adhesive 230 to be applied is larger than the other portion to be coated.

As the plastic sheet to be used in the present invention, polyvinyl chloride, polyethylene terephthalate or the like is preferably used. A ruled line 240 may be previously formed along a line to be bent, along which the plastic sheet may be bend into a tube-like form. It is sufficient that opposing end portions of the plastic sheet fabricated into a tube-like form are overlapped as the surfaces to be bonded 220.

As the adhesive 230 to be used, a hot melt type adhesive or a solvent type adhesive may be used.

As a method of coating the adhesive 230 in the present invention, when an extruder is used for an adhesive such as a hot melt type adhesive, both end portions 221 to be bonded are detected in combination of a photo tube and an electromagnetic valve, and an amount of discharge of the adhesive may be adjusted by controlling the outlet port of the extruder by means of the electromagnetic valve.

In a case of using a coating roller to apply a solvent type adhesive to the surfaces to be bonded, a coating roller having a coating pattern is used so that a width of the adhesive applied to an area near the end portions of the surfaces to be bonded is longer than the other portion.

In applying the adhesive 230, it is preferable that the width of the adhesive applied to the end portions 221 of the surfaces to be bonded or an amount of coating of the adhesive per unit surface area is in a range of 120–400% as much as the amount of coating of the adhesive for the other portion, whereby the amount of the adhesive applied to the central portion can be reduced to an amount of 50–80% of the conventional amount of the adhesive used. The width and the amount of the adhesive as described above can assure a sufficient peeling strength for the end portions of the surfaces 221 to be bonded.

When the width of the adhesive at the both end portions or the amount of the adhesive per unit surface area is less than 120% of the width of the adhesive on the other portion or the amount of the adhesive per unit surface area, the width of the adhesive on the other portion or the amount of the adhesive per unit surface area exceeds 80% as a conventional standard. Accordingly, an expected result that the total amount of coating is reduced while the bonding strength is maintained in the same manner as the conventional technique can not be achieved. When it exceeds 400%, the width of the adhesive on the other portion or the amount of the adhesive per unit surface area is less than 50% as the conventional standard whereby the bonding strength becomes insufficient and the appearance is poor.

EXAMPLE

A hard polyvinyl chloride sheet of 0.3 mm thick, which had a shape to form a container having a cubic form of 50 mm at each side, was stamped wherein ruled lines 240 and a bonding surface having a width of 8 mm were formed. Hot melt type adhesive 230 was coated at the both end portions 221 having dimensions of 6 mm long and 6 mm wide and the central portion of dimensions of 36 mm long and 1.5 mm wide. The total length of the adhesive was 48 mm and the total amount of coating was 0.1 g.

As Comparative Example, a hard polyvinyl chloride sheet of 0.3 mm thick was stamped in the same manner as Example, and the same adhesive 230 was coated on the bonding surface 220 of dimensions of 48 mm long and 3 mm wide. The total amount of coating was 0.14 g.

The plastic sheets of the Example and the Comparative Example were respectively bonded and were brought into a flatly folded state which was before the application of a box machine. Then, a hook 250 formed by bending a metallic rod having a diameter of 10 mm was inserted from an open end by 15 mm. An end of the hook was attached to a spring balance. The spring balance was pulled at a speed of 20 cm/min and a load to effect the peeling of the end portions of the bonding surfaces was measured.

As a result, the tensile strength for the Example was 4.6 Kg, and the tensile strength for the Comparative Example was 3.7 Kg. It was found that the bonding strength of the end portions 221 of the present invention was excellent even though the amount of the adhesive 230 in the Example of the present invention was smaller than that of the Comparative Example, i.e. 0.1 for the Example and 0.14 g for the Comparative Example. The amount of the adhesive can be saved because as the length of the bonding surface is large, the proportion of the other portion to be coated is large.

The embodiment shown in FIGS. 8 to 10 for a plastic casing formed by bending a plastic sheet and bonding surfaces to be bonded with an adhesive wherein the width the adhesive near the end portions of the bonding surface or the amount of the adhesive per unit surface area is larger than that in the other portion. Accordingly, there can be provided a plastic container having an excellent bonding strength at the end portions of a bonding surface and good appearance even though the amount of the adhesive is small in comparison with a conventional plastic container.

Figure 11:
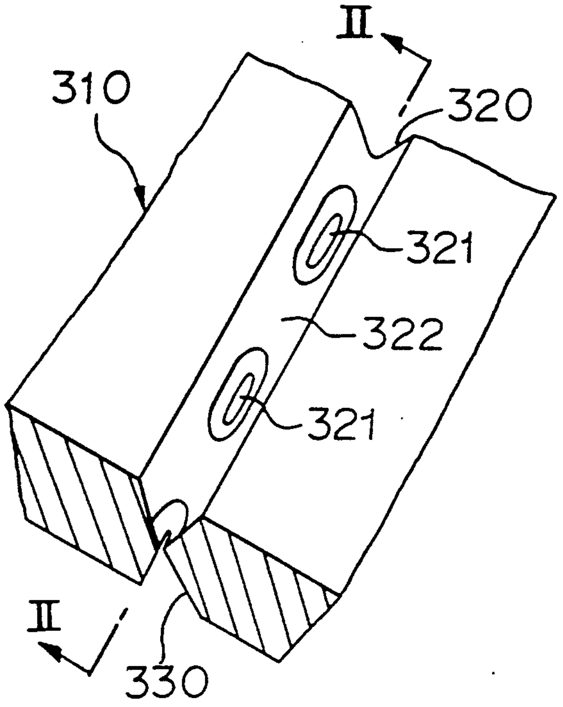
FIG. 11 is an enlarged perspective view showing an embodiment of a ruled line for bending formed in a plastic sheet.

FIGS. 11 though 19 show another embodiment of the plastic sheet with a ruled line of the present invention. The plastic sheet is provided with a groove as a ruled line for bending at each side surface of the plastic sheet wherein the groove in at least one side surface comprises shallow recess portions and deep recess portions in the longitudinal direction of the groove.

In a case of making a container for package by bending a plastic sheet, it is usual to previously form ruled lines for bending in the plastic sheet and bending the sheet along the ruled lines. Conventional plastic sheets with ruled lines for bending are usually provided with the ruled lines in one surface of the plastic sheets.

However, there was a problem that it was difficult to bend the sheet because the corner portion in the width direction of the ruled line comes to contact with the sheet surface when it is bent. In order to solve such problem, it is considered to broaden the width of the ruled line. In this case, however, it is necessary to push the press die for forming the ruled line at a high pressure to thereby form wide and deep ruled line in the plastic sheet. There is a danger of breaking the plastic sheet depending on the physical properties of the sheet. Further, when a wide ruled line is formed, the plastic sheet is stretched in the lateral direction. Accordingly, there may result a wrinkle or waviness in the sheet at portions where a longitudinal ruled line crosses a lateral ruled line when a small-sized box-like container is manufactured.

Figure 12:
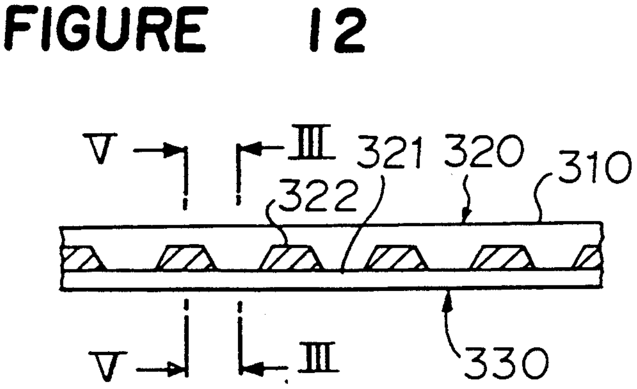
FIG. 12 is a cross-sectional view taken along a line II—II in FIG. 11.

FIGS. 11 and 12 show another embodiment of the plastic sheet with a ruled line for bending according to the present invention. A plastic sheet 310 is provided with a groove 320 in its one surface and a groove 330 in the other surface. The groove 320 comprises deep recess portions 321 and shallow recess portions 322 in the longitudinal direction of the groove 320. The groove 330 may have the same construction as the groove 320. As the plastic sheet 310, various kinds of sheet can be used depending on purposes of use. For instance, a hard plastic sheet of a material such as polyvinyl chloride, polypropylene, polyethylene terephthalate may be used. The plastic sheet 310 preferably has a thickness of about 0.1–1.0 mm.

Figure 13:
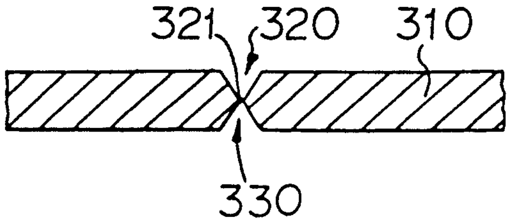
FIG. 13 is a cross-sectional view taken along a line III—III in FIG. 12.
Figure 14:
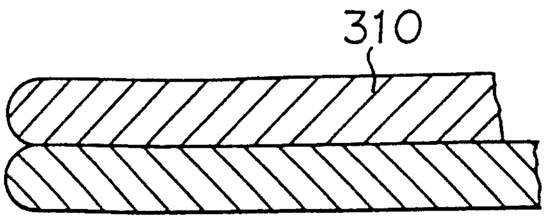
FIG. 14 is a cross-sectional view showing a state of bending of the portion shown in FIG. 13.

The grooves 320, 330 are formed to have appropriate dimensions depending on a kind of material and the thickness of plastic sheet. However, it is desirable that the width of the opening of each of the grooves is about 0.5–3 times as much as the thickness of a sheet used. When the width of the opening is smaller than the above-mentioned value, the bending characteristic is poor. On the other hand, when the width of the opening is larger, the processing characteristic at the time of forming the grooves is poor. Further, the length of the deep recess portions 321 and the shallow recess portions 322 in the groove 320 should respectively be about 0.2–2 mm. The deep recess portions 321 may be penetrating holes which penetrate the plastic sheet 310 from the upper surface to the lower surface to be communicated with the groove 330. On the other hand, it is necessary that the depth of the shallow recess portions is determined so as to form connecting portions having an appropriate strength between the groove 320 and the groove 330 formed in the lower surface of the sheet 310. Namely, the depth of the shallow recess portions 322 should be 0.1–0.8 times as the thickness of the plastic sheet. However, the depth of the shallow recess portions may be zero depending on the thickness of the plastic sheet 310. Thus, by forming grooves as ruled lines for bending in the both surfaces of the plastic sheet 310, it can be easily bent in either direction, as shown in FIG. 14, at the portions where the deep recess portions of the groove 320 communicate with the groove 330 formed in the other surface of the sheet (FIG. 13).

Figure 15:
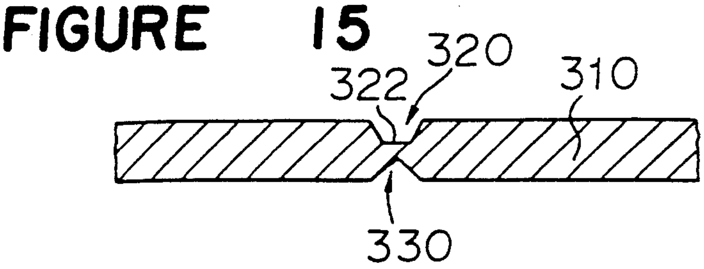
FIG. 15 is a cross-sectional view taken along a line V—V in FIG. 13.
Figure 16:
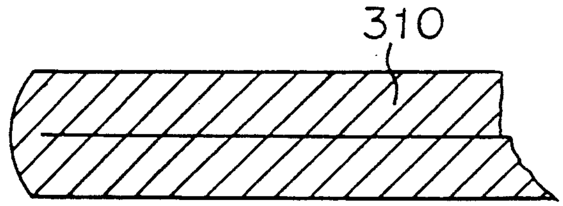
FIG. 16 is a cross-sectional view showing a state of bending of the portion shown in FIG. 15.

The shallow recess portion 322 of the groove 320 (FIG. 15) can be bent at the thinner wall portion. Accordingly, the plastic sheet can be easily bent in either direction, and occurrence of a burr can be prevented (FIG. 16).

Figure 17:
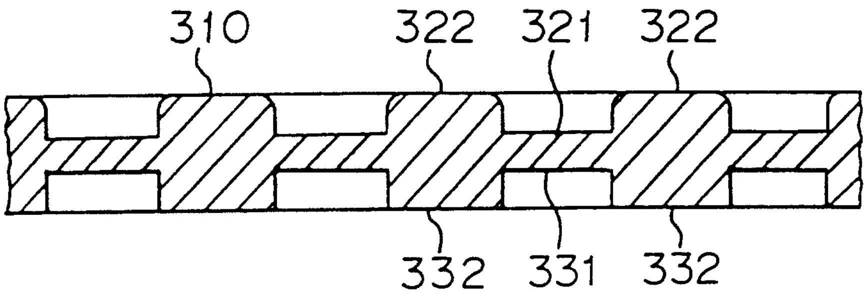
FIG. 17 is a cross-sectional view of another embodiment of the plastic sheet with a ruled line according to the present invention.

As shown in FIG. 17, the plastic sheet 310 may have shallow recess portions 322, 332 having a depth of zero and deep recess portions 321, 331, which are alternately formed in both surfaces of the plastic sheet 310. Further, the deep recess portions 321, 331 in the both surfaces may be shifted in the longitudinal direction, or the length of the deep recess portions 321, 331 may be changed, or the deep recess portions may be recesses having three steps.

Figure 18:
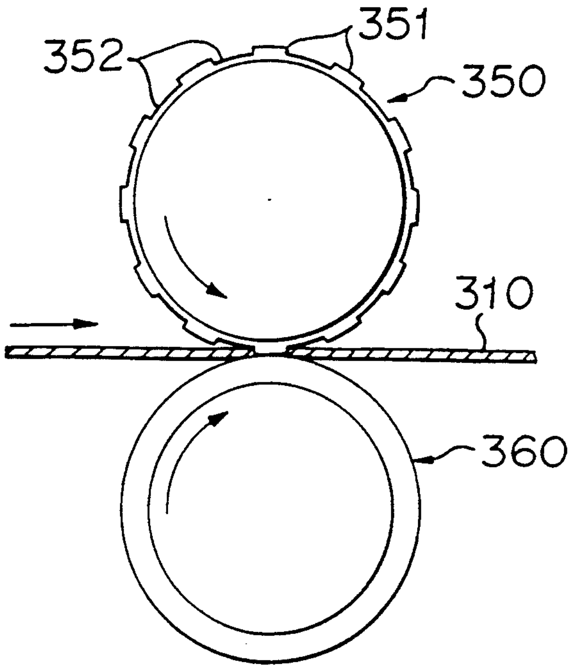
FIG. 18 is a front view showing an embodiment of a ruled line forming device.
Figure 19:
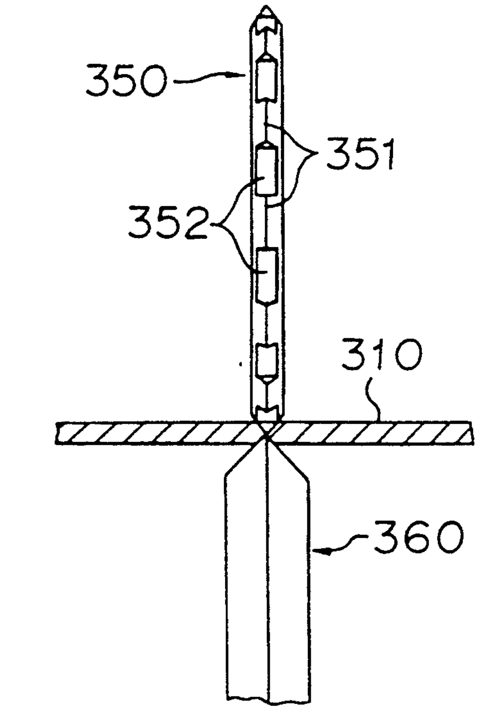
FIG. 19 is a side view of the ruled line forming device.

FIGS. 18 and 19 show a device for forming a ruled line having the above-mentioned structure. The device comprises an upper roller 350 and a lower roller 360. The upper roller 350 is in a form of a gear wheel in which projections 351 for forming the deep recess portions and recesses 352 for forming the shallow recess portions are alternately provided, and the top of the projections 351 has a V-shaped blade. The lower roller 360 has an inversed V-like blade or an inversed U-like blade. By passing the plastic sheet 310 between the rollers 350, 360 having the above-mentioned structures, the ruled line having the shape as shown in FIGS. 11 and 12 can be obtained. The rollers 350, 360 may be heated in order to improve processability. Further, the both rollers 350, 360 may be in a form of a gear wheel so that ruled line having the groove structure shown in FIG. 17 can be obtained.

The dimensions of the projections and recesses, and the shape of blades of the both rollers and the gap between the rollers can be suitably selected depending on the wall thickness and the physical properties of the plastic sheet to be processed. A plurality of ruled lines can be formed simultaneously by providing a plurality of blades in a parallel relation.

An Example of the plastic sheet shown in FIGS. 11 and 12 will be described.

A polypropylene sheet having a thickness of 0.3 mm was used and rollers having the construction shown in FIGS. 18 and 19 were used to form a ruled line in the polypropylene sheet. The upper roller having a diameter of 70 mm, the difference in height (depth) of 0.15 mm, a length between the projections and the recesses of 0.5 mm and an angle of the top of blade was 70° was used. The lower roller having a diameter of 70 mm and an angle of the top of a V-like blade of 70° was used. The gap between the top of the blade of the both rollers was zero and they were rotated at a speed of 5 M/min and the polypropylene sheet was fed between the rollers. As a result, the ruled line having the groove structure shown in FIGS. 11 and 12 was obtained. The polypropylene sheet could be easily bent in either direction along the ruled line. Further, there was found no burr and a touch feel was good.

Thus, the plastic sheet as described above has the grooves in the both surfaces of the plastic sheet. Accordingly, the bending characteristic can be improved and no burr is produced. Accordingly, there is no danger of catching of a string even when cloth is put in a container made of the plastic sheet. Further, a bent portion having a good touch feel can be obtained.

FIGS. 20 through 27 show another embodiment of an easily bentable plastic sheet which has a plurality of ruled lines for bending to be formed in a box-like container wherein shallow recess portions and deep recess portions are formed in the longitudinal direction of the lines, the deepest portion of each of the ruled lines is in a state of communicating with the other side of the plastic sheet, and the length of the shallow recess portions is variable depending on the depth of the shallow recess portions and/or the deep recess portions and the length of the ruled lines.

Figure 26:
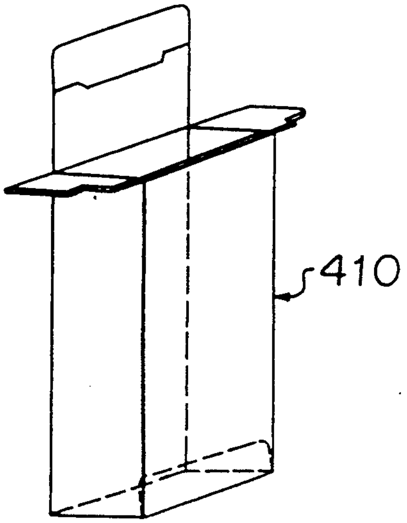
FIG. 26 is a perspective view showing an embodiment of a box formed by bending a sheet material.
Figure 27:
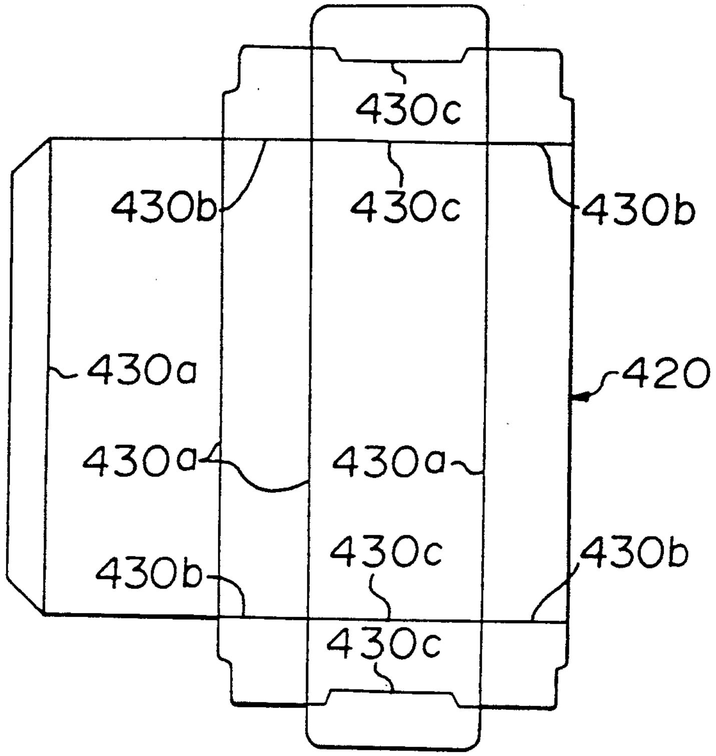
FIG. 27 is a plane view of a plastic sheet for forming a box in a developed state.

In a conventional method of producing a box-like container 1, as shown in a perspective view of FIG. 26, by bending a plastic sheet, a plurality of ruled lines for bending 430*a*, 430*b*, 430*c* . . . are formed at predetermined positions of a plastic sheet 420 which has been punched into a predetermined shape as shown in a developed view in FIG. 27, and the plastic sheet is formed into a box by bending the sheet along the ruled lines for bending.

When the ruled lines 430*a*, 430*b*, 430*c* are formed in the plastic sheet 420, the bending characteristic of the plastic sheet 420 is adjusted by controlling a remaining thickness of the sheet at the portions of the ruled lines 430*a*, 430*b*, 430*c*. Since a slight change of the remaining thickness causes a large change of the bending characteristic, it is necessary to precisely form the ruled lines. Further, the bending characteristic is changed depending on the length of the ruled lines, e.g. the long ruled line 430*a* and the short ruled line 430*b*, even through the remaining thickness of the sheet is the same. Namely, when ruled lines having the same depth are formed, the bending characteristic of the plastic sheet at the long ruled line 430*a* may be poor or the strength of the plastic sheet at the short ruled line 430*b* may be weakened. Accordingly, a suitable depth can be determined for each ruled line depending on the length of the ruled lines.

However, since a plastic sheet generally used is thin as 0.1–1.0 mm, it is difficult to form a suitable depth in each ruled line.

Figure 28:
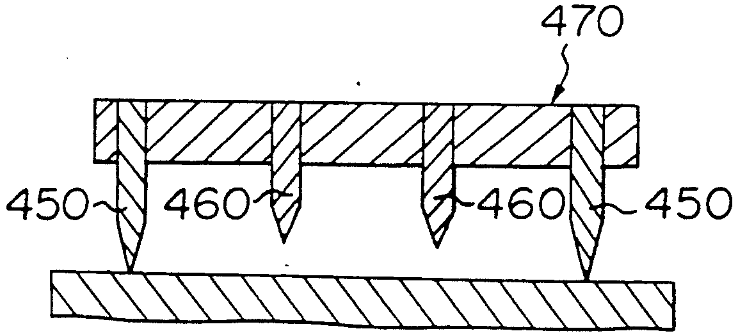
FIG. 28 is a cross-sectional view showing a conventional press die which performs the punching of a sheet material and the formation of a ruled line.

When a box-like container 410 is produced, a Thompson type blade 470 wherein cutting blades 450 and ruled line blades 460 are fixed in a single and same die is used as shown in FIG. 28. When a plurality of different ruled lines are to be formed simultaneously with a die having a plurality of different blades corresponding to each of the ruled lines, and if the height of each of the ruled line blades corresponding to each of the ruled lines is adjusted, the pressing force at each ruled line portion is greatly changed. Accordingly, the depth of each of the ruled lines is changed by mutual influence of pushing forces, and it is difficult to conduct precise adjustment of the ruled line blades.

Such problem can be solved by changing the depth of shallow recess portions, i.e. the remaining thickness of a plastic sheet at the shallow recess portions, depending on the length of a ruled line for bending. Namely, the remaining thickness is made small for a long ruled line, and on the other hand, the remaining thickness is made large for a short ruled line. Or, the proportion of length of the shallow recess portions to the deep recess portions is changed. Namely, the proportion of length is made small for a long ruled line, and on the other hand, the proportion is made large for a short ruled line. With such construction, an uniform bending characteristic can be obtained regardless of the length of the ruled lines.

Further, a through hole may be formed for the deepest recess portion. This provides an advantage as follows. When the Thompson type die is used to form a plurality of ruled lines simultaneously, it is enough to just make the top of the blades in contact with a flat table on which a plastic sheet is placed. It is unnecessary to adjust finely the position of the blade which forms the deepest recess portion.

Figure 20:
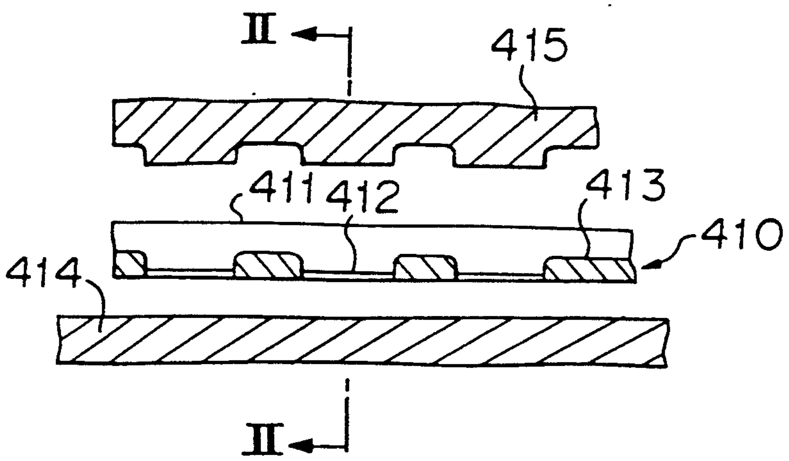
FIG. 20 is a cross-sectional view of another embodiment of the ruled line forming device.
Figure 21:
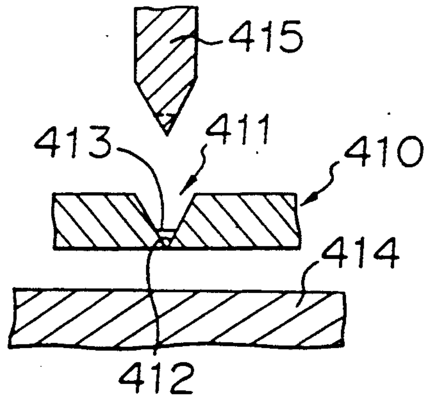
FIG. 21 is a cross-sectional view taken along a line II—II in FIG. 20.

As shown in FIGS. 20 and 21, a ruled line for bending 411 is formed in a plastic sheet 410. The ruled line 411 is provided with deep recess portions 412 and shallow recess portions 413 in the longitudinal direction of the ruled line. The ruled line 411 is formed by placing the plastic sheet 410 on a flat table 414 followed by pushing the sheet 410 with a ruled line blade 415 which comprises blade portions corresponding to the deep recess portions 412 and the shallow recess portions 413.

Figure 22:
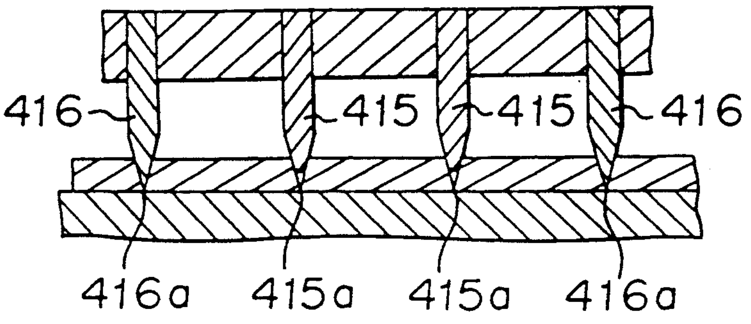
FIG. 22 is a cross-sectional view showing a press die which performs the punching of a sheet material and the formation of a ruled line.

The deep recess portions 412 of the ruled line 411 are formed into a state that the plastic sheet 410 are substantially punched out, namely, a state that the plastic sheet 410 is completely punched out or a state that the plastic sheet has a vary thin wall thickness at the deep recess portions. For this, the edge 415*a* of the blades 415 which form the deep recess portions 412 is set to the same height as the edge 416*a* of punching blades 416 as shown in FIG. 22.

The depth of the shallow recess portions 413, i.e. the remaining thickness of the shallow recess portions is determined depending on the length of the ruled line for bending 411. For instance, when the box like container 410 as shown in FIG. 26 is to be prepared, three kinds of ruled lines, i.e. long ruled lines 430*a*, short ruled lines 430*b* and intermediate ruled lines 430*c* are formed as shown in FIG. 27. In this case, the depth of the shallow recess portions 413 is made large for the long ruled lines 430*a* so that the remaining thickness of this portion is small. On the other hand, the depth of the shallow recess portions 413 is made small for the short ruled lines

413*b* so that the remaining thickness at this portions is large.

Figure 23:
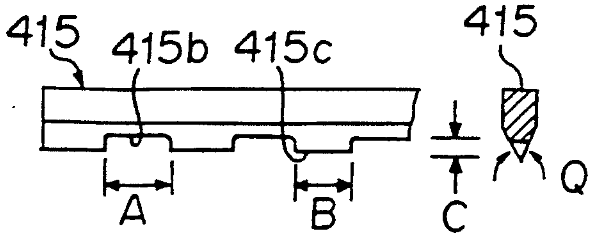
FIG. 23 is a diagram illustrating a shape of a blade for forming a ruled line.
Figure 24:
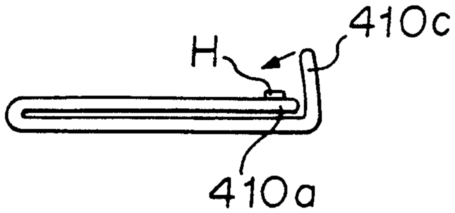
FIG. 24 is a cross-sectional view showing an example of bending and bonding a sheet material.
Figure 25:
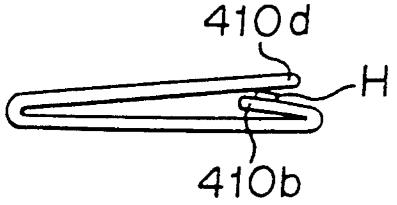
FIG. 25 is a cross-sectional view showing a state of bending and bonding a sheet material.

As an example, a transparent polypropylene sheet having a thickness of 0.3 mm was used. In order to form a ruled line having a length of 100 mm and a ruled line of a length of 50 mm, a ruled line blade 415 as shown in FIG. 23 was prepared wherein the length A of a portion corresponding to the shallow ruled line portion and the length of B of a portion 415*c* corresponding to the deep ruled line are respectively determined as 0.7 mm, and the angle of the top of blade was 60°. Further, the difference of height between the portion 415*b* corresponding to the shallow recess portion and the portion 415*c* corresponding to the deep recess portion was determined to be 0.17 mm for the ruled line having a length of 100 mm and 0.2 mm for the ruled line having a length of 50 mm. As a result of bending the polypropylene sheet at the ruled lines of 100 mm and 50 mm, the substantially same bending characteristic could be obtained.

Thus, by changing the depth of the shallow recess portions of the ruled line, i.e. the remaining thickness portion of the polypropylene sheet at the shallow recess portions of the ruled line, depending on the length of ruled lines, the substantially same bending characteristic can be obtained regardless of the length of the ruled line. Further, use of an automatic box machine is allowed to use for easy processing and assembling, and a box-like container having excellent appearance can be obtained.

In the above-mentioned embodiment, the lengths A and B of the shallow and deep recess portions are respectively determined to be 0.7 mm in order to obtain the same bending characteristic. However, the ratio of the length A to the length B may be changed in a range of 80% to 20% depending on in the length of ruled lines. Even in this case, the same bending characteristic can be obtained regardless of the length of the ruled lines.

There is a sanitary problem in using a solvent type adhesive to form a box-like container by bending the plastic sheet with ruled lines for bending. Instead of using the solvent type adhesive, there is a hot melt type adhesive. However, there is a problem in using the hot melt type adhesive. Namely, when the hot melt type adhesive in molten state is coated on the plastic sheet, the plastic sheet is deformed by the heat of the molten hot melt adhesive.

In order to eliminate the deformation of the plastic sheet, it is desirable that the hot melt adhesive H in a molten state is coated on inside margins 410*a*, 410*b* after bending the plastic sheet, and then, outside margins 410*c*, 410*d* of the plastic sheet are overlapped on the inside margins 410*a*, 410*b*. In such measures, the outside margins 410*c*, 410*d* which are conspicuous come to contact with the inside margins 410*a*, 410*b* with adhesive, the temperature of which is somewhat reduced even though there take place a curve or waviness in the inside margins 410*a*, 410*b* due to the heat of the hot adhesive. Accordingly, it is difficult to cause thermal deformation at that portion, and the outer appearance of the box-like container can be kept in beautiful condition.

Usually, the temperature of the hot melt adhesive just after application to a plastic sheet of a material such as polyvinyl chloride, polyethylene terephthalate or polypropylene, is in a range of 80° C.–150° C. The temperature is far higher than the softening temperature of plastic sheet. However, a box-like container having excellent bonding characteristic and appearance can be obtained by taking the above-mentioned steps.

For the plastic sheet, a sheet of polyethylene terephthalate, polycarbonate, polyvinyl chloride, polystyrene or a composite sheet of these materials may be used instead of the polypropylene sheet.

Thus, in accordance with the plastic sheet with a plurality of ruled lines wherein each of the ruled lines comprises shallow recess portions and deep recess portions, the deepest portion of the recess are formed by punching out the plastic sheet, and the proportion of the shallow recess portions to the deep recess portions is changed depending on the length of the ruled line. Accordingly, the substantially the same bending characteristic can be obtained regardless of the length of the ruled lines, and a box-like container having excellent appearance can be obtained with use of an automatic box machine.

Further, since the deepest recess portion of the ruled line is in a state of punching out the plastic sheet, it is enough to adjust the positions of the blades for forming ruled lines and the blades for cutting the plastic sheet in a case that the cutting of the plastic sheet and the forming of the ruled lines are conducted simultaneously. This does not require precise adjustment of the positions of the blades. Further, various kinds of plastic sheet for bending can be easily manufactured by preparing blades for forming various patterns of ruled lines.

FIGS. 29 through 33 show another embodiment of the plastic sheet with a ruled line wherein the ruled line is formed in combination of different recess portions or cut portions which are arranged in the longitudinal direction of the ruled line.

In a case of the ruled line formed in combination of projections and recess of simple shapes, when recess portions are formed to be deep in order to obtain easy bending, the plastic sheet is apt to break. On the other hand, when the recess portions are formed shallow, it is difficult to bend the plastic sheet. Accordingly, high precision is required to form the recess portions.

FIGS. 29 through 32 show a plastic sheet 510 in which a ruled line 520 is formed. The ruled line 520 is featurized by combining different kinds of short grooves 531, 532, 533 or cut portions 534 in the longitudinal direction of the ruled line 520. By suitably selecting such a combination, a plastic sheet with a ruled line for bending can be obtained wherein it has a flexible bending characteristics depending on the physical properties and the thickness of the plastic sheet 510 and it is hardly broken.

There are various kinds of recessed portions for the ruled line 520. For instance, there are a shallow recess 531, 533 having an opening W1 of a large width, a deep recess 532, 534 having an opening W2 of a small width (recess may be of a penetrating type), a recess 533 comprising two parallel grooves so that the shape in cross section of the recess is in substantially a letter of W (FIG. 32), a recess 534 comprising a simple cut portion (FIG. 32) and a recess comprising three parallel grooves so that a plurality of small projections and recesses are formed in the recessed portion. The above mentioned recesses may be used in a suitable combination.

Figure 29:
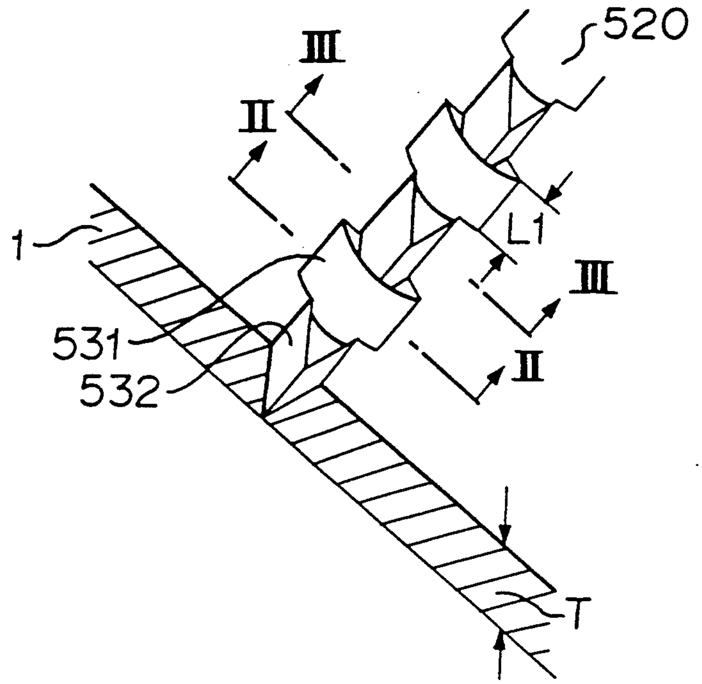
FIG. 29 is a perspective view partly omitted of an embodiment of the plastic sheet with a ruled line for bending according to the present invention.

The ruled line shown in FIGS. 29 through 31 will be described in more detail.

Figure 30:
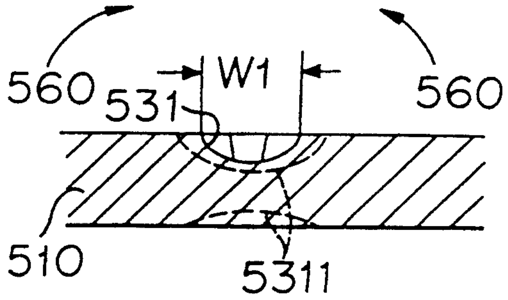
FIG. 30 is a cross-sectional view taken along a line II—II in FIG. 29.
Figure 31:
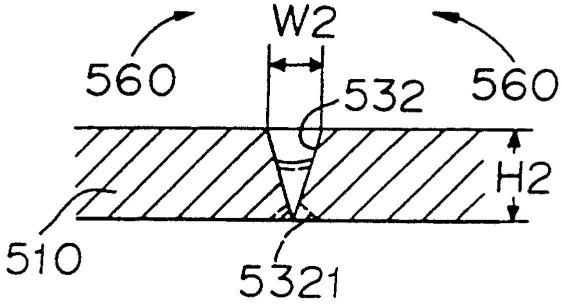
FIG. 31 is a cross-sectional view taken along a line III—III in FIG. 29.

The ruled line comprises recess portions 531 each having an opening formed in a surface of the plastic sheet 510, whose width of opening W1 is wide and shallow as shown in FIG. 30, and recess portions 532 each having an opening whose width W2 is narrow and deep as shown in FIG. 31. These recess portions 531, 532 are alternately arranged in a side-by-side relation as shown in FIG. 29. Since each of the recess portions 531 is shallow, the wall thickness of the plastic sheet 510 at these portions is thick, and it is difficult to break easily. Further, since the width of opening W1 is wider than that of the adjacent recess portions 532, stresses by distortions produced by bending can be dispersed to the large width portions whereby it is easily bent and it is difficult to break. When the length L1 of each of the recess portions 531 is in a range of 0.5–10 times as much as the thickness T of the plastic sheet 510, it is further difficult to causing the breaking of the plastic sheet and it is easy to bent.

Since the recess portions have the width of opening W2 narrower than that of the recess portions 531, the stresses produced by bending the plastic sheet can be absorbed by the width portion of the recess portions 531, and it is a small possibility of breaking. Further, since the recess portions 532 are deep, it can be easily bent. It is preferable that when the depth H2 of the recess portions 532 is determined to be 80% or more of the thickness T of the plastic sheet 510, it is easy to bent the plastic sheet. When the recess portions are formed to be completely cut portions, they become easily stain. Accordingly, it is preferable to form the recess portions without any cut portion.

In FIGS. 30 and 31, when the plastic sheet having a ruled line is completely folded along the ruled line in the direction of an arrow mark 560 and then, the plastic sheet is restored into the original flat state, the width of opening of the recess portion 531 is widened and becomes thin as indicated by dotted lines 5311 as shown in FIG. 30. In addition, as shown in FIG. 31, the bottom portion of the recess portion 532 becomes cut and the plastic sheet is deformed as indicated by a dotted line 5321. Thus, the plastic sheet can be easily bent.

In this case, it is necessary to suitably select a plastic sheet having an elongation of 100% or more at the breaking when it is stretched at a temperature of 23° C. When the elongation is lower than 100%, the plastic sheet is easily broken at the ruled line portion when the sheet is once bent. As the plastic sheet 510, it is desirable to use a polyethylene terephthalate sheet having a degree of crystallization of 5% or lower.

Figure 32:
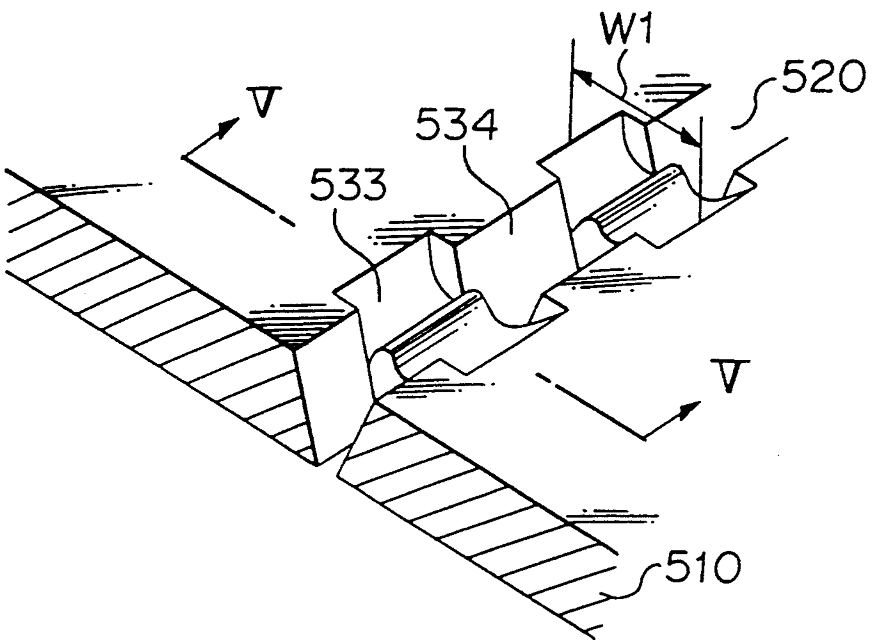
FIG. 32 is a perspective view of another embodiment of the plastic sheet with a ruled line for bending according to the present invention.

The plastic sheet with a ruled line shown in FIGS. 32, 33 will be described.

Figure 33:
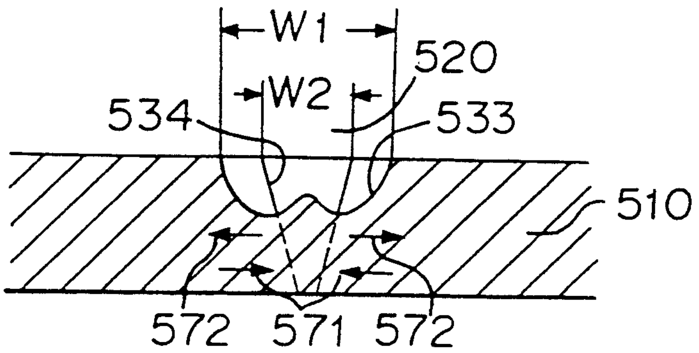
FIG. 33 is a cross-sectional view taken along a line V—V in FIG. 32.

The width of opening W1 of each of the recess portions 533 is wide and the recess portion 355 is formed of two parallel grooves by which the cross-sectional view of the recess portion 533 is in a letter of W as shown in FIG. 33. Since the wall thickness of the central portion of the W-like recess is large, it is difficult to break.

Since the width of opening W2 of the cut portion 534 is small, and an end in the longitudinal direction of the cut portion 534 is contiguous to a large wall thickness portion of the adjacent recess portion 533.

Since he ruled line is formed by arranging the recess portions 533 and the cut portions 534 alternately, the cut portion 534 can provide an easily bending function, and the central portion of the recess portions 533 can provide a reinforcing function and resistance to breakage.

When the ruled line of the above-mentioned structure is formed by pressing a plastic sheet with a ruled line blade, the portion corresponding to the cut portion 534 undergoes an expanding force in the direction of arrow marks 571 due to a wedge effect by the ruled line blade. On the other hand, the recess portions 533 adjacent to the cut portion 534 undergoes a shrinking force at the central portion as shown by arrow marks (FIG. 33), whereby the expansion force and shrinking force are canceled, and it is a small possibility of breaking of the plastic sheet even when the plastic sheet is strongly pressed by the ruled line blade.

In the plastic sheets having the structures described above, the ruled line for bending is formed by combining short recess portions or cut portions having different shapes in the longitudinal direction, whereby the combined recess portions or cut portions mutually compensate, and easiness of bending and difficulty of breaking are well balanced.

Figure 34:
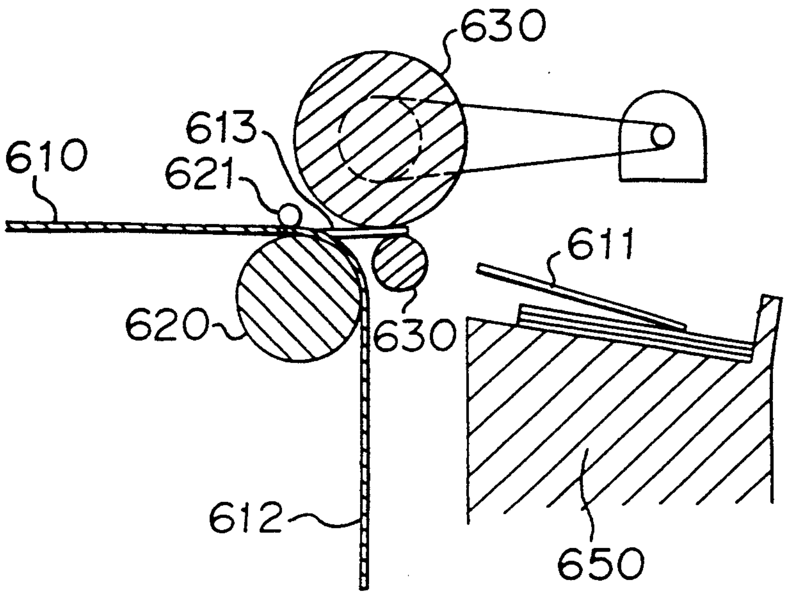
FIG. 34 is a cross-sectional view of a device for separating products of plastic sheet after punching operation.
Figure 35:
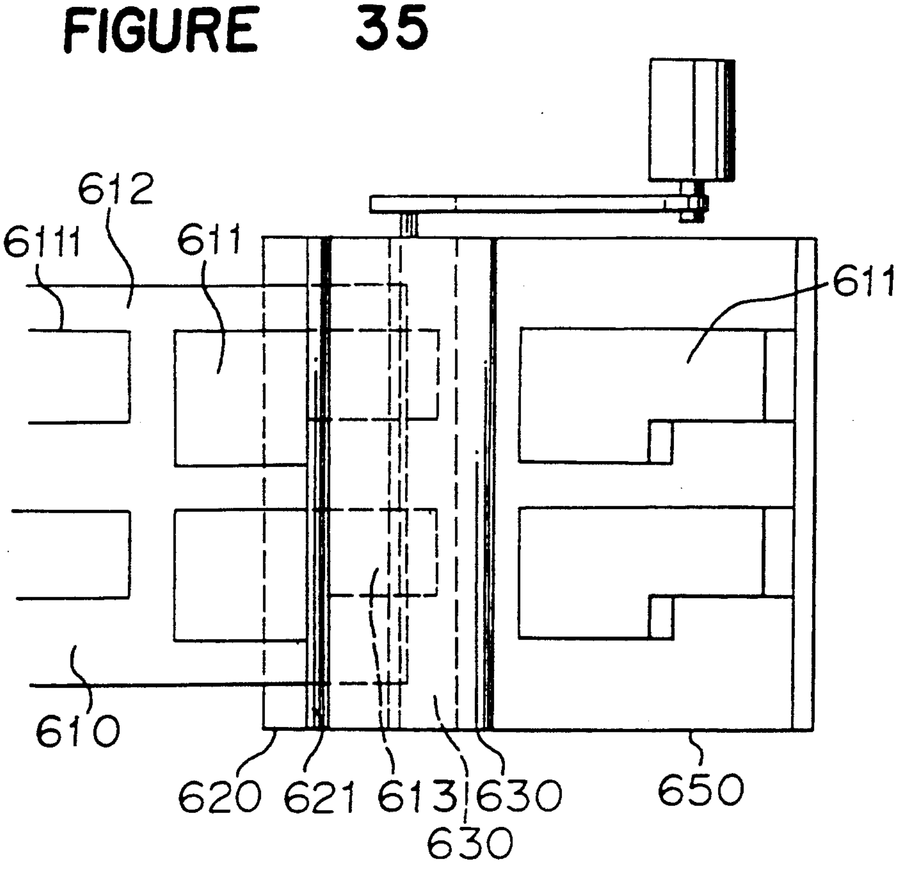
FIG. 35 is a plane view of the device shown in FIG. 34.
Figure 36:
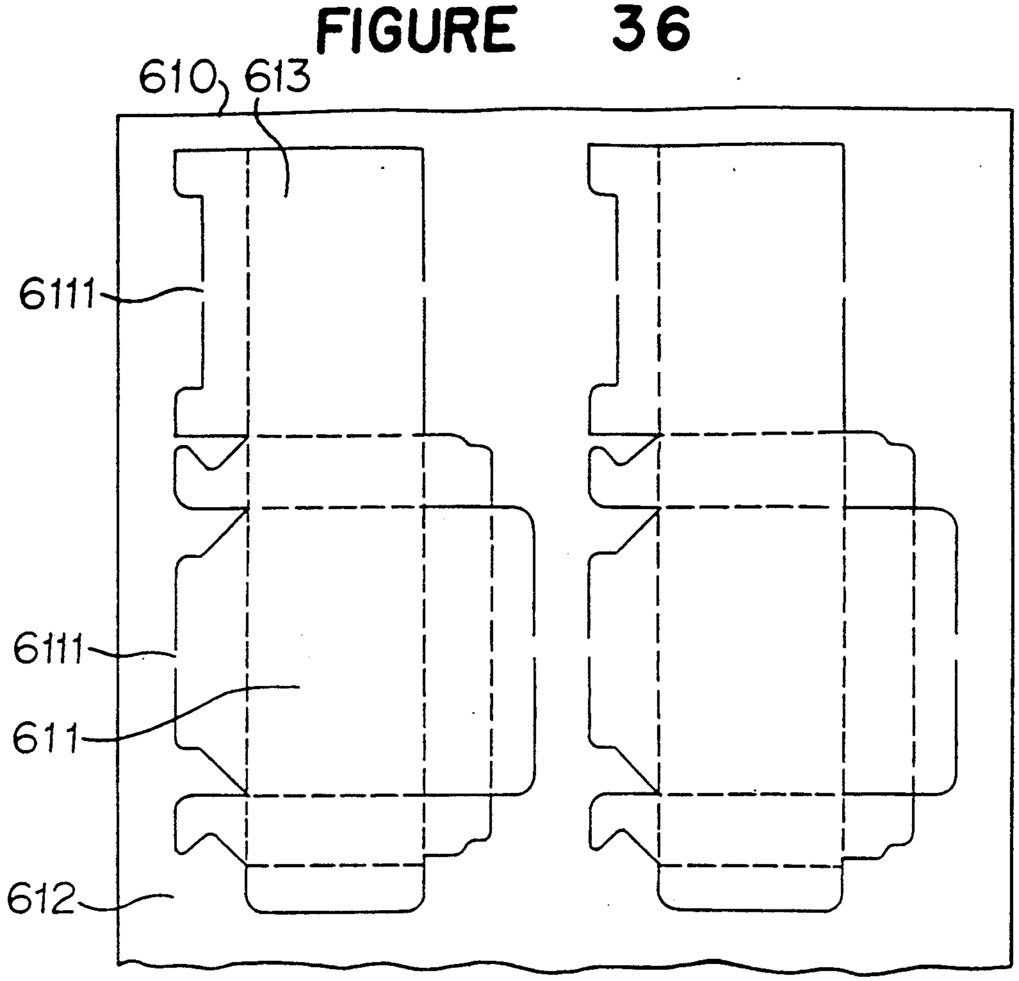
FIG. 36 is a plane view showing an example of a plastic sheet material after punching.

FIGS. 34 through 36 show an embodiment of separating a punched-out plastic sheet-like product from a blank sheet wherein the sheet-like product is punched from the blank sheet leaving a thin connecting portion between the sheet-like product and the blank sheet; the punched product is fed along the round surface of a feeding roller in a curved state so as to rise a part of the product from the blank sheet, and a part of the product raised from the blank sheet is clamped by means of a pair of taking rollers which are arranged just after the feeding roller, whereby the punched sheet-like product is taken.

Figure 37:
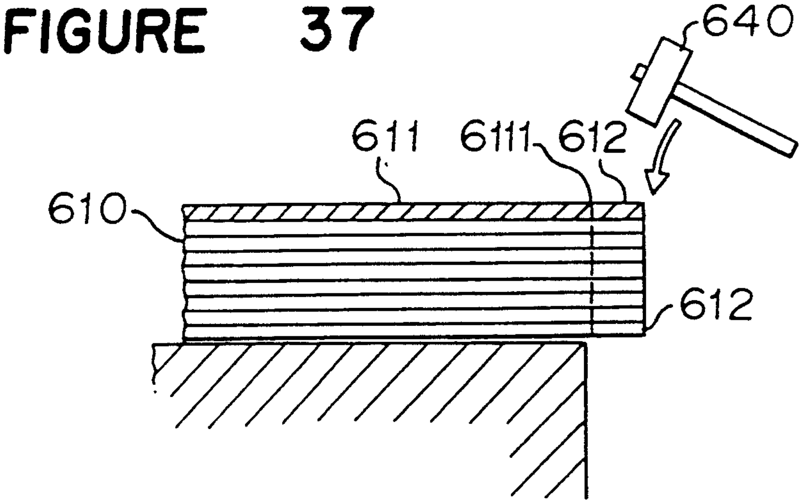
FIG. 37 is a cross-sectional view showing a conventional method of separating products of plastic sheet after punching.

Generally, a box-shaped container made of paper or a plastic sheet is formed by punching-out a flat sheet material (and forming ruled lines for bending simultaneously) by means of a Thompson type die, bending the punched-out sheet along the ruled lines, and bonding marginal portions. When punching operations are carried out, connecting portions 6111 are formed between the blank sheet 612 and punched out products 611 so that the products 611 are not completely separated from the blank sheet 612, in consideration of processability in punching operations as shown in a plane view in FIG. 36. After the punching operations, a large number of blank sheet 610 which have been cut into a regular size are stacked as shown in FIG. 37, and an operator strongly hits the stacked blank sheets 612 with a hammer 640 to separate the punched-out products from their connecting portions 6111. In this case, there is a danger that he may hit a part of the products 611 by the hammer whereby a defective product is produced. Further, there may cause flaws in the products because there is several times of the sheet materials.

Another method of separation of the punched-out products is proposed wherein a blank sheet undergoes punching operations leaving the products in the blank sheet with thin connecting portions by means of the Thompson type die, and the punched products are subsequently separated by punching with use of male and female dies. This method requires the male and female dies and unsuitable for a small scale production. Further a trouble of easily occurs in the male and female dies in an apparatus for separating the punched products from the blank sheet.

The method of separating the punched product 611 from the remaining portion 612 of the blank sheet 610 will be described with reference to FIGS. 34 though 36. In the separating method, the sheet material 610 is fed along the surface of the feeding roller 620 in a curved state so as to rise a part 613 of the punched product 611 from the remaining portion 612 of the sheet, and the raising part 613 of the product 611 raised from the remaining portion 612 of the sheet is clamped by the pair of taking rollers 630 which are arranged just after the feeding roller 620. Thus, the product 611 is taken.

The sheet material having subjected to punching operations is passed along the feeding roller 620 in a curved form of an inversed U-like shape. In this case, the leading portion of the product 611 is not provided with a connecting portion 6111. Accordingly, the portion 613 of the product 611 which have been previously punched tends to rise in a flat shape from the remaining portion 612 of the curved sheet material due to its elastic recovery function. At this moment, the product 611 is connected to the remaining portion 612 of the sheet material by mean of the connecting portion 6111. Since the pair of taking rollers 630 are arranged at positions where the part 613 rises, the part 613 of the product is caught. When the speed of the taking rollers 630 is made the same or faster than that of the feeding roller 620, the connecting portion 611 is broken and the product 611 is separated from the remaining portion 612 of the sheet material. The separated product drops on a table 650 provided in the front of the taking rollers. The table may be a belt conveyor which can transfer the separated product to a necessary location. The transfer of the sheet material is conducted by continuously taking the remaining portion of the sheet material by means of a nip roller. Alternately, the sheet material can be transferred by placing a pushing roller 621 on the feeding roller to clamp the remaining portion of the sheet material between the both rollers.

EXAMPLE

As shown in FIGS. 34 and 35, a feeding roller 620 having a diameter of 20 mm and an upper taking roller 630 having a diameter of 50 mm and a lower taking roller 630 were arranged so that the center distance between the feeding roller 620 and the lower taking roller 630 was 30 mm and the center distance of the feeding roller 620 and the upper taking roller 630 was 40 mm. The feeding roller 620 and the taking roller 630 were driven at speeds of 20 m/min and 25 m/min respectively. A continuous vinyl chloride sheet having a thickness of 0.2 mm and a width of 300 mm in which stamped sheet-like products each of which was used for a box having a length of 50 mm, a width of 30 mm and a height of 10 mm were formed as shown in FIG. 36, was fed between the rollers to conduct continuously separating operations. As a result, the products 611 could be well separated from the sheet material 612 without any flaw.

In the method of separating stamped sheet-like products from a sheet material, a sheet material is fed along the curved surface of a feeding roller in a curved state to thereby raise a part of the products from the remaining portion of the sheet material, and the top edge of the raised sheet-like products is clamped by means of a pair of taking rollers which are disposed just after the feeding roller, whereby only the sheet-like products are taken. Thus, the sheet-like products can be separated at a high speed from the sheet material without requiring a zig or a die regardless of the shape and the material of the products. In addition, it is unnecessary to conduct operations such as mold registration as conducted in a conventional method of separating sheet-like products by means of male and female dies. Further, there is no danger of occurrence of flaws which are resulted by separating the products from stacked sheet materials with a hammer. Particularly the method of separation of the present invention is applicable to a plastic sheet such a hard vinyl chloride sheet.

I claim:

1. A plastic sheet with a ruled line for bending which comprises a groove as a ruled line extending in a longitudinal direction in at least one surface of a plastic sheet, wherein the groove includes a deep recess portion and a shallow portion in the longitudinal direction of the groove, with the deep recess portion extending more deeply into said plastic sheet relative to said shallow portion, wherein said shallow portion includes first and second ends, and wherein chamfered portions having a radium of curvature of 0.05-1 mm are formed at each of said first and second ends of the shallow portion, and further wherein said deep recess portion and said shallow portion are disposed at different longitudinal locations of said groove.

2. The plastic sheet of claim 1, wherein a plurality of deep recess portions and shallow portions are alternately disposed along the longitudinal direction of said groove.

3. The plastic sheet of claim 2, wherein lengths of each of said deep recess portions and said shallow portions are in the range of 0.3-1.5 mm in said longitudinal direction.

4. A plastic sheet having a ruled line for bending which comprises a groove forming said ruled line, said groove extending in a longitudinal direction and formed in a surface of said plastic sheet, wherein said groove includes a plurality of deep recess portions and a plurality of shallow portions, said deep recess portions and said shallow portions alternately disposed in the longitudinal direction of the groove, and further wherein said shallow portions each include first and second ends, said first and second ends spaced with respect to one another in said longitudinal direction, and further wherein chamfered portions are provided at each of said first and second ends of said shallow portions, said deep recess portions extending more deeply into said plastic sheet relative to said shallow portions.

5. The plastic sheet of claim 4, wherein said chamfered portions have a radius of curvature of 0.05-1 mm.

* * * * *